(12) United States Patent
Gupta et al.

(10) Patent No.: US 10,142,129 B1
(45) Date of Patent: Nov. 27, 2018

(54) BUM PACKET FILTERING IN MULTI-HOMED EVPN OVERLAY NETWORKS

(71) Applicant: Juniper Networks, Inc., Sunnyvale, CA (US)

(72) Inventors: Sayantani Gupta, Bangalore (IN); Babu Singarayan, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 102 days.

(21) Appl. No.: 15/277,574

(22) Filed: Sep. 27, 2016

(51) Int. Cl.
*H04L 12/28* (2006.01)
*H04L 12/46* (2006.01)
*H04L 12/947* (2013.01)
*H04L 12/721* (2013.01)

(52) U.S. Cl.
CPC .......... *H04L 12/4641* (2013.01); *H04L 45/66* (2013.01); *H04L 49/25* (2013.01)

(58) Field of Classification Search
CPC ...... H04L 12/4641; H04L 45/66; H04L 49/25
See application file for complete search history.

(56) References Cited

U.S. PATENT DOCUMENTS

| | | | | |
|---|---|---|---|---|
| 8,705,526 B1* | 4/2014 | Hasan | ................ | H04L 12/4633 370/216 |
| 8,724,456 B1* | 5/2014 | Hong | ...................... | G06F 11/00 370/225 |
| 8,787,149 B1* | 7/2014 | Ramanathan | ........... | H04L 45/58 370/216 |
| 9,794,180 B2* | 10/2017 | Thoria | ................ | H04L 47/2483 |
| 10,020,960 B2* | 7/2018 | Wang | ................... | H04L 12/4625 |
| 2015/0172132 A1* | 6/2015 | Tessmer | ................. | H04L 45/16 370/390 |
| 2016/0094364 A1* | 3/2016 | Subramaniyam | ... | H04L 12/4625 370/401 |
| 2016/0094365 A1* | 3/2016 | Subramaniyam | ... | H04L 12/4625 370/401 |
| 2016/0094366 A1* | 3/2016 | Wang | .................. | H04L 12/4625 370/401 |
| 2016/0134525 A1* | 5/2016 | Zhang | ................. | H04L 12/6418 370/392 |
| 2016/0301597 A1* | 10/2016 | Jayakumar | ............ | H04L 45/245 |
| 2017/0063600 A1* | 3/2017 | Singh | ...................... | H04L 12/18 |
| 2017/0279624 A1* | 9/2017 | He | .......................... | H04L 12/18 |
| 2017/0317919 A1* | 11/2017 | Fernando | ................ | H04L 45/16 |

OTHER PUBLICATIONS

Sajassi et al., "BGP MPLS-Based Ethernet VPN," RFC 7432, Internet Engineering Task Force (IETF), Feb. 2015, 56 pp.

(Continued)

*Primary Examiner* — Wutchung Chu
(74) *Attorney, Agent, or Firm* — Shumaker & Sieffert, P.A.

(57) ABSTRACT

In general, techniques are described for filtering duplicate broadcast, unknown unicast, and multicast (BUM) packets in a network in which EVPN traffic is tunneled, using a tunneling protocol such as VXLAN or NVGRE, over an IP core network to provide network virtualization overlay (NVO) between provider edge (PE) devices that operate as Network Virtualization Endpoints (NVEs) for the NVO/ Virtual Tunnel Endpoints (VTEPs) for the tunneling protocol.

17 Claims, 8 Drawing Sheets

(56) References Cited

OTHER PUBLICATIONS

Mahalingam et al., "Virtual eXtensible Local Area Network (VXLAN): A Framework for Overlaying Virtualized Layer 2 Networks over Layer 3 Networks," RFC 7348, Independent Submission, Aug. 2014, 22 pp.

Sajassi et al., "A Network Virtualization Overlay Solution using EVPN," L2VPN Workgroup Internet Draft, draft-ietf-bess-evpn-overlay-04, Jun. 10, 2016, 27 pp.

Martini et al., "Inter-Chasis Communication Protocol for Layer 2 Virtual Private Network (L2VPN) Provider Edge (PE) Redundancy," RFC 7275, Internet Engineering Task Force (IETF), Jun. 2014, 83 pp.

"Configuring ICCP for MC-LAG," Technical Documentation, Juniper Networks, Dec. 3, 2013, 2 pp.

\* cited by examiner

BUM PACKET FILTERING IN MULTI-HOMED EVPN OVERLAY NETWORKS

TECHNICAL FIELD

The invention relates to network devices and, more particularly, to network devices providing packet forwarding.

BACKGROUND

In computer networks, a network device may be connected to one or more network devices via two or more physical links. The term "link" is often used to refer to the connection between two devices on a network. The link may be a physical medium, such as a copper wire, a coaxial cable, any of a host of different fiber optic lines, or a wireless connection. In addition, network devices may define "virtual" or "logical" links, and map the virtual links to the physical links. In some cases, these two or more links may be logically grouped or aggregated together to form an "aggregated bundle." For example, one or more routers may be connected to a customer edge device via an aggregate bundle of multiple physical links. In some cases, Ethernet links may be combined into one logical interface for higher bandwidth and redundancy. Ports of the Ethernet links that are combined in this manner are referred to as a link aggregation group (LAG) or bundle.

Generally, link aggregation may provide connection redundancy. That is, should one of the links of the aggregated bundle fail, the network device may begin sending traffic to the other network device across the non-failed links of the aggregated bundle, thereby providing redundancy in the form of redundant links for delivery of traffic between two devices.

In one example, a customer network site may be given redundant connectivity to a network through multiple provider edge (PE) network devices (e.g., routers, switches, etc.). This form of redundancy is referred to as "multi-homing." In one type of multi-homing, referred to as "active-active" multi-chassis link aggregation (MC-LAG) configuration, each of the PE devices is configured to actively forward traffic and the multiple, physical links providing the multi-homed connectivity are logically aggregated and treated as a single, logical link. In MC-LAG configured networks, MC-LAG enables a customer edge (CE) network device to form a logical LAG interface between two MC-LAG peer nodes. MC-LAG provides, for example, redundancy and multi-homing support for the MC-LAG peer nodes.

An Ethernet Virtual Private Network (EVPN) may be used to extend two or more remote layer two (L2) customer networks through a core layer three (L3) network (usually referred to as a provider network or core network), in a transparent manner, i.e., as if the L3 network does not exist. In particular, the EVPN transports L2 communications, such as Ethernet packets or "frames," between customer networks via traffic engineered label switched paths (LSP) through the core network in accordance with one or more multiprotocol label switching (MPLS) protocols. In a typical configuration, PE devices coupled to the CE network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

In an EVPN, L2 address learning (also referred to as "MAC learning") on a core-facing interface of a PE device occurs in the control plane rather than in the data plane (as happens with traditional bridging) using a routing protocol. For example, a PE device typically uses the Border Gateway Protocol (BGP) (i.e., an L3 routing protocol) to advertise to other PE devices the MAC addresses learned from the local consumer edge network devices to which the PE device is connected. As one example, a PE device may use a BGP route advertisement message to announce reachability information for the EVPN, where the BGP route advertisement specifies one or more MAC addresses learned by the PE device instead of L3 routing information. Additional example information with respect to EVPN is described in "BGP MPLS-Based Ethernet VPN," Request for Comments (RFC) 7432, Internet Engineering Task Force (IETF), February, 2015, the entire contents of which are incorporated herein by reference.

VXLAN provides a tunneling scheme to overlay L2 networks on top of L3 networks. VXLANs establish tunnels for communicating traffic, e.g., L2 broadcast, unknown unicast, and multicast (BUM) packets, over common physical IP infrastructure between the PE devices. That is, VXLAN overlay networks are designated for each customer network and operated over the existing LAN infrastructure of the data center. Devices that support VXLANs are called virtual tunnel endpoints (VTEPs) (also known as "VXLAN tunnel endpoints")—VTEPs can be end hosts or network switches or routers. VTEPs encapsulate VXLAN traffic and de-encapsulate that traffic when it leaves the VXLAN tunnel. Additional example information with respect to VXLAN is described in "Virtual eXtensible Local Area Network (VXLAN): A Framework for Overlaying Virtualized Layer 2 Networks over Layer 3 Networks," Request for Comments (RFC) 7348, August 2014, the entire contents of which are incorporated herein by reference.

EVPN enables connecting customer sites using Layer 2 virtual bridges. VXLANs enable extending a Layer 2 connection over an intervening Layer 3 network while providing the network segmentation a VLAN provides, but without the scaling limitation of traditional VLANs. EVPN with VXLAN encapsulation may in this way improve Layer 2 connectivity in a multi-tenant environment. EVPN may be used to provide a network virtualization overlay (NVO) solution using VXLAN or Network Virtualization using Generic Routing Encapsulation (NVGRE) for tunnel encapsulation over an IP core network that provides IP connectivity between NVO endpoints (NVEs). Further example structural and functional details of an EVPN network overlay are described in "A Network Virtualization Overlay Solution using EVPN," draft-ietf-bess-evpn-overlay-04, Internet Engineering Task Force (IETF), Jun. 10, 2016, the entire contents of which are incorporated herein by reference.

SUMMARY

In general, techniques are described for filtering duplicate broadcast, unknown unicast, and multicast (BUM) packets in a network in which EVPN traffic is tunneled, using a tunneling protocol such as VXLAN or NVGRE, over an IP core network to provide network virtualization overlay (NVO) between provider edge (PE) devices that operate as Network Virtualization Endpoints (NVEs) for the NVO/ Virtual Tunnel Endpoints (VTEPs) for the tunneling protocol. The PE devices may be configured to provide an EVPN-VXLAN network overlay for layer 2 (L2) virtual bridge connectivity across the L3 network among customer networks attached to the PE devices. A customer edge (CE) device of one of the customer networks may be multi-homed to a first PE device and second PE device using links in a multi-chassis link aggregation group (MC-LAG) topology to provide redundancy and load balancing between the PE devices. Each of the first and second PE devices may each be configured to serve the same Ethernet segment using a unique combination of VXLAN ID and Source-VTEP IP address for the PE device. As such, the first and second PE devices may serve as both peer MC-LAG PE nodes and as peer VXLAN nodes (peer VTEPs) but may not present a common IP address to the IP core network. Moreover, both peer MC-LAG PE devices are mapped to a common Ethernet segment of the EVPN-VXLAN overlay, the common Ethernet segment including the MC-LAG In one example of filtering BUM packets on select interfaces, the first PE device forwards at most one packet of EVPN BUM traffic, received from a local customer network, to the second PE device. For example, for an L2 BUM packet received by the first PE device from the multi-homed CE device, the first PE device may send a single copy of the L2 BUM packet to the second PE device by sending the L2 BUM packet via the inter-chassis link (ICL) for the MC-LAG while eschewing sending a copy of the L2 BUM packet to the second PE device via the EVPN-VXLAN overlay. For instance, the first PE device may receive an extended inter-chassis control protocol (ICCP) message from the second PE device that includes MC-LAG configuration information and VTEP configuration information identifying the second PE device as a peer (remote) VTEP of the first PE device. Based on the extended ICCP message, the first PE device may configure an interface for the peer VTEP that is blocked for the MC-LAG bridge domain. Because the interface for the peer VTEP is blocked for the MC-LAG bridge domain, the first PE device may send a copy of a L2 BUM packet received from the multi-homed CE device to the second PE device via the ICL, but the first PE device does not send a copy of the L2 BUM packet on the EVPN-VXLAN overlay to the second PE device configured as the peer VTEP.

In another example of filtering BUM packets on select interfaces, the first PE device forwards at most one packet of EVPN BUM traffic, received from a local customer network, to the second PE device. For example, for an L2 BUM packet received by the first PE device from a single-homed CE device, the first PE device may send a single copy of the L2 BUM packet to the second PE device via the ICL for the MC-LAG while eschewing sending a copy of the L2 BUM packet to the second PE device via the EVPN-VXLAN overlay. For instance, the first PE device may receive an extended ICCP message from the second PE device that includes MC-LAG configuration information and VTEP configuration information identifying the second PE device as a peer (remote) VTEP of the first PE device. Based on the extended ICCP message, the first PE device may configure an interface for the peer VTEP that is blocked for the MC-LAG bridge domain. Because the interface for the peer VTEP is blocked for the MC-LAG bridge domain, the first PE device may send a copy of an L2 BUM packet originated from the single-homed CE device to the second PE device via the ICL, but the first PE device does not send a copy of the L2 BUM packet on the EVPN-VXLAN overlay to the second PE device configured as the peer VTEP. The first PE device may flood one or more copies of the L2 BUM packet to other VTEPs of the VXLAN core, i.e., other than to the second PE device. If the first PE device is a designated forwarder (DF) for the Ethernet segment, the first PE device may also send a copy of the L2 BUM packet to the multi-homed CE device.

In another example of filtering BUM packets on select interfaces, the first PE device configures an ingress interface of the ICL link with the second PE to impersonate an ingress interface for the IP core network (e.g. the VXLAN core). For example, the first PE device may configure a data plane forwarding unit (such as a packet forwarding engine) to interpret packets received at the ingress interface of the ICL link as if the packets are received at an ingress interface of the IP core network (also referred to as a "VXLAN core network") where VXLAN is used as a tunneling protocol for the overlay. As a result, the data forwarding unit may apply, for an L2 BUM packet received at the ingress interface of the ICL link, split-horizon rules for the tunneling protocol to prevent duplicate BUM packets for the BUM packet being forwarded to the VXLAN core. The first PE device may therefore avoid sending a duplicate BUM packet to any PE devices of the VXLAN core, including the second PE device. The first PE device may, however, forward a copy of the BUM packet to any attached customer networks in the EVPN-VXLAN network overlay (other than the multi-homed customer network for the MC-LAG).

In another example of filtering BUM packets on select interfaces, the first PE device and second PE device do not forward EVPN BUM traffic, received from a remote customer network via the VXLAN core, to each other over the ICL link. For example, for an L2 BUM packet received by the first PE device and second PE device from a remote CE device over the EVPN-VXLAN overlay, the first PE device and second PE device may not send a copy of the L2 BUM packet to each other via the ICL. Each of the first PE device and second PE device may configure a check on an egress interface for the ICL that identifies and blocks L2 BUM packets received from the VXLAN core to ensure that the first PE device and second PE device do not send a copy of the L2 BUM packet received from the VXLAN core to each other via the ICL. The first PE device may, however, forward a copy of the BUM packet to any attached customer networks in the EVPN-VXLAN network overlay (other than the multi-homed customer network for the MC-LAG). If the first PE device is a designated forwarder (DF) for the Ethernet segment, the first PE device may also send a copy of the L2 BUM packet to the multi-homed CE device.

A similar solution obtains for an EVPN-NVGRE network overlay. The techniques may provide one or more advantages. For example, BUM filtering according to the described techniques may reduce, and in some cases eliminate duplication of BUM traffic and loop formation on an Ethernet segment mapped to multiple MC-LAG PE devices. In this way, the techniques allow the members of an MC-LAG to identify peer VTEP members of the EVPN-VXLAN network such that PE devices are configured to filter an L2 BUM packet on at least one of an interface for the ICL and an interface for the peer VTEP to ensure that only one copy of the L2 BUM packet is received by each customer network and PE device.

In one example a method includes receiving, by a first provider edge (PE) device, configuration data that configures the first PE device to provide an Ethernet Virtual Private Network (EVPN) network overlay over a layer 3 core network using a tunneling protocol, wherein the first PE device and a second PE device are peer virtual tunnel endpoints (VTEPs) for the tunneling protocol, and wherein the configuration data further configures the first PE device to provide, with the second PE device, multi-chassis link aggregation group (MC-LAG) multi-homing to a customer device using two or more links that form an MC-LAG that is an Ethernet segment of the EVPN network overlay, wherein an Inter-Chassis Link (ICL) connects the first PE device and the second PE device for the MC-LAG. The method also includes filtering, by the first PE device, a layer 2 (L2) broadcast, unknown unicast, and multicast (BUM) packet, on one of an interface for the ICL and an interface for a VTEP with the second PE device to ensure that a single copy of the L2 BUM packet is received by each of the first PE device and the second PE device.

In another example a network device includes one or more processors operably coupled to a memory. The network device also includes a routing engine configured for execution by the one or more processors to: receive configuration data that configures the network device to provide an Ethernet Virtual Private Network (EVPN) network overlay over a layer 3 core network using a tunneling protocol, wherein the network device and a second network device are peer virtual tunnel endpoints (VTEPs) for the tunneling protocol, and wherein the configuration data further configures the network device to provide, with the second network device, multi-chassis link aggregation group (MC-LAG) multi-homing to a customer device using two or more links that form an MC-LAG that is an Ethernet segment of the EVPN network overlay, wherein an Inter-Chassis Link (ICL) connects the network device and the second network device for the MC-LAG. The network device also includes a forwarding engine configured for execution by the one or more processors to filter a layer 2 (L2) broadcast, unknown unicast, and multicast (BUM) packet on an interface for a VTEP with the second network device to ensure that a single copy of the L2 BUM packet is received by the second network device.

In another example, a network device includes one or more processors operably coupled to a memory. The network device also includes a routing engine configured for execution by the one or more processors to: receive configuration data that configures the network device to provide an Ethernet Virtual Private Network (EVPN) network overlay over a layer 3 core network using a tunneling protocol, wherein the network device and a second network device are peer virtual tunnel endpoints (VTEPs) for the tunneling protocol, and wherein the configuration data further configures the network device to provide, with the second network device, multi-chassis link aggregation group (MC-LAG) multi-homing to a customer device using two or more links that form an MC-LAG that is an Ethernet segment of the EVPN network overlay, wherein an Inter-Chassis Link (ICL) connects the network device and the second network device for the MC-LAG. The network device also includes a forwarding engine configured for execution by the one or more processors to filter a layer 2 (L2) broadcast, unknown unicast, and multicast (BUM) packet on an interface for the ICL to the second network device to ensure that a single copy of the L2 BUM packet is received by the second network device.

In another example, a non-transitory computer-readable storage medium includes instructions for causing at least one programmable processor of a network device to: receive configuration data that configures the network device to provide an Ethernet Virtual Private Network (EVPN) network overlay over a layer 3 core network using a tunneling protocol, wherein the network device and a second network device are peer virtual tunnel endpoints (VTEPs) for the tunneling protocol, and wherein the configuration data further configures the network device to provide, with the second network device, multi-chassis link aggregation group (MC-LAG) multi-homing to a customer device using two or more links that form an MC-LAG that is an Ethernet segment of the EVPN network overlay, wherein an Inter-Chassis Link (ICL) connects the network device and the second network device for the MC-LAG. The non-transitory computer-readable storage medium also includes instructions for causing at least one programmable processor of a network device to filter a layer 2 (L2) broadcast, unknown unicast, and multicast (BUM) packet on one of an interface for the ICL and an interface for a VTEP with the second network device to ensure that a single copy of the L2 BUM packet is received by each of the network device and the second network device.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
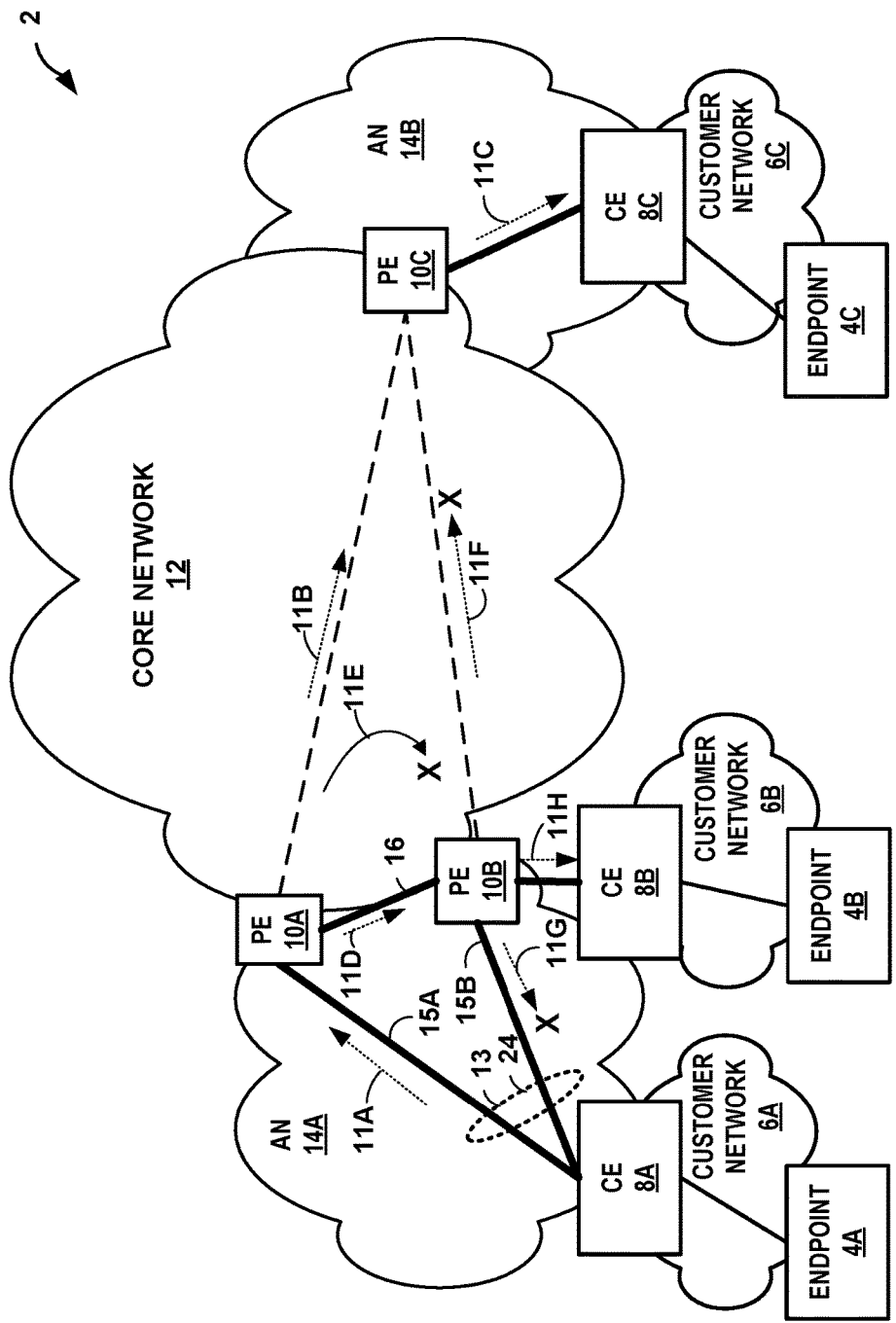
FIG. 1 is a block diagram illustrating an example network system in which provider edge (PE) network devices provide techniques for filtering duplicate broadcast, unknown unicast, and multicast (BUM) packets in a network in which EVPN traffic is tunneled, using a tunneling protocol such as VXLAN or NVGRE, over an IP core network to provide network virtualization overlay (NVO) between provider edge (PE) devices that operate as Network Virtualization Endpoints (NVEs) for the NVO/Virtual Tunnel Endpoints (VTEPs) for the tunneling protocol, according to the techniques described herein.

FIG. 1 is a block diagram illustrating an example network system 2 in which provider edge (PE) network devices apply techniques for filtering duplicate broadcast, unknown unicast, and multicast (BUM) packets in a network in which EVPN traffic is tunneled, using a tunneling protocol such as VXLAN or NVGRE, over an IP core network to provide network virtualization overlay (NVO) between provider edge (PE) devices that operate as Network Virtualization Endpoints (NVEs) for the NVO/Virtual Tunnel Endpoints (VTEPs) for the tunneling protocol, according to the techniques described herein. In the example of FIG. 1, PE devices 10A-10C ("PEs 10") provide virtual layer 2 bridging for customer endpoints 4A-4C ("endpoints 4") associated with customer networks 6A-6C ("customer networks 6") over a layer 3 (L3) core network 12 ("core network 12") via customer edge (CE) devices 8A-8C ("CEs 8"). The configuration of network 2 illustrated in FIG. 1 is merely an example. For example, an enterprise may include any number of customer networks 6 interconnected by PE devices 10 using virtual layer 2 bridging. Nonetheless, for ease of description, only customer networks 6A-6C are illustrated in FIG. 1.

PEs 10 and CEs 8 may each represent a router, switch, or other suitable network devices that participates in a layer two (L2) virtual private network (VPN) (L2VPN) service, such as an EVPN. Customer networks 6 may be networks for geographically or logically separated sites of an enterprise or may represent networks for different customers of the core network 12 (or tenants of a data center network). Each of endpoints 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

CEs 8 may attach to PEs 10 via access networks 14A, 14B (collectively, "access networks 14"). Each of access networks 14 may include a network of transport routers that transport L2 communications for customer networks 6 through respective access networks 14 for that customer. In some examples, one or more of access networks 14 may represent any Layer 2 (L2) network, such as a physical or virtual LAN.

PEs 10 may exchange routing information via core network 12 and process the routing information, selecting paths through its representation of the topology of the core network 12 to reach all available destinations to generate forwarding information. In other words, PEs 10 reduce these paths to so-called "next hops" which identify which of its interfaces traffic destined for a particular destination is to be forwarded. Each of PEs 10 then installs this forwarding information in a forwarding plane of the respective one of PEs 10, whereupon the forwarding plane forwards received traffic in accordance with the forwarding information.

Core network 12 may represent a service provider network that is owned and operated by a service provider, which is usually a large telecommunications entity or corporation. Core network 12 represents an L3 computer network, where reference to a layer followed by a number refers to a corresponding layer in the Open Systems Interconnection (OSI) model. Core network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the "network layer" and "IP" throughout this disclosure.

Although not illustrated, core network 12 may be coupled to one or more networks administered by other providers, and may thus form part of a large-scale public network infrastructure, e.g., the Internet. Consequently, customer networks 6 may be viewed as edge networks of the Internet where the core network is a service provider network. Core network 12 may provide computing devices within customer networks 6 with access to the Internet, and may allow the computing devices within the customer networks to communicate with each other. In some cases, core network 12 represents a data center L2/L3 switching fabric (or "data center fabric network") that interconnects CEs for tenants of the data center, where a tenant may represent an organization or a logical partitioning of resources, data, and/or applications within the data center.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Network system 2 may implement multi-chassis link aggregation group (MC-LAG) technology to provide node-level and link-level redundancy for core network 12 connectivity by customer network 6 using MC-LAG peer nodes, e.g., PEs 10A, 10B. For example, PEs 10A, 10B are each connected to CE 8A through multiple, physical links 15A, 15B ("links 15"), and are configured to logically aggregate and treat links 15 as a single, logical MC-LAG link 24 (hereinafter, "MC-LAG 24"). That is, PEs 10A, 10B, as MC-LAG peer nodes, share a common link aggregation group endpoint (CE 8A) and present a single logical link aggregation group to the remote end.

MC-LAG 24 implements an inter-chassis control protocol (ICCP) to exchange control information between MC-LAG peer nodes, PEs 10A, 10B, by replicating control traffic and forwarding states across the MC-LAG peer nodes. ICCP enables PE devices to form a redundancy group (RG) by synchronizing configuration and/or running state data. That is, although separate devices, PEs 10A, 10B collectively treat MC-LAG 24 as a single logical interface from a forwarding perspective even though each of the PE devices connect to only a subset of the physical links 15 that comprises the overall MC-LAG 24.

ICCP is based on the Transmission Control Protocol (TCP) and uses IP routes to reach an MC-LAG peer. For example, the ICCP protocol may be configured to communicate the IP address of a local source MC-LAG node, e.g., PE 10A. This may be a specified address or an interface address of PE 10A. The ICCP protocol may also be configured to communicate a peer MC-LAG node, e.g., PE 10B, which specifies the specified address or interface address of PE 10B. The ICCP protocol may be further configured to communicate a redundancy group list, which specifies the source MC-LAG node (PE 10A) and its peer MC-LAG node (PE 10B) that are to provide redundancy for one another.

An inter-chassis link (ICL) 16 coupling PEs 10A, 10B is used to forward data traffic between peer MC-LAG nodes, PEs 10A, 10B, and provides redundancy. When media access control (MAC) addresses are learned on one MC-LAG peer (e.g., PE 10A), the MAC addresses may be propagated to the other MC-LAG peer (e.g., PE 10B) via ICL 16. PEs 10A, 10B exchange ICCP messages via ICL 16. Further example details of ICCP are described in L. Martini et. al., "Inter-Chassis Communication Protocol for Layer 2 Virtual Private Network (L2VPN) Provider Edge (PE) Redundancy," Internet Engineering Task Force, RFC 7275, June 2014, which is incorporated in its entirety.

Core network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider core network 12 includes L2 EVPN service. Core network 12 that represents an L2/L3 switch fabric for one or more data centers may implement an L2 EVPN service. An EVPN is a service that provides a form of L2 connectivity across a core L3 network, such as core network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening core network and instead act and operate as if these customer networks were directly connected and form a single L2 network. In a way, EVPN enables a form of a transparent LAN connection between two customer sites that each operates an L2 network and, for this reason, EVPN may also be referred to as a "transparent LAN service."

PEs 10 may be configured to provide an EVPN instance (EVI), which consists of one or more broadcast domains. Generally, an EVI may be associated with a virtual routing and forwarding instance (VRF) on a PE device, such as any of PEs 10. Consequently, multiple EVIs may be configured on PEs 10 for Ethernet segment 13, each providing a separate, logical layer two (L2) forwarding domain. In this way, multiple EVIs may be configured on each of one or more of PEs 10. Ethernet segment 13 for an EVI configured for PEs 10 in this configuration example includes MC-LAG 24.

In some examples, Ethernet Tags are then used to identify a particular broadcast domain, e.g., a virtual LAN (VLAN), in an EVI. A PE device may advertise a service label (or "MAC label," "MAC route label," or more simply "label") per-<ESI, Ethernet Tag> combination. This label assignment methodology is referred to as a per-<ESI, Ethernet Tag> label assignment. Alternatively, a PE device may advertise a unique label per MAC address. In still another example, a PE device may advertise the same single label for all MAC addresses in a given EVI. This label assignment methodology is referred to as a per-EVI label assignment. Such labels are advertised by PEs 10 in EVPN MAC advertisement routes.

VXLAN provides an overlay tunneling protocol to encapsulate traffic and tunnel the traffic over a physical IP infrastructure between Network Virtualization Edges, e.g., VXLAN Tunneling Endpoints (VTEPs), in the EVPN network. In particular, VXLAN creates virtual L2 networks spanning physical L3 networks between VTEPs. For example, VTEPs communicate traffic with a 24-bit segment ID, Virtual Network Identifier (VNI), that maps to a tenant VLAN identifier, where the tenant VLAN identifier gets mapped to an EVPN instance (EVI). The VNI is included an outer header that encapsulates an inner MAC frame such that MAC addresses may overlap across segments, but are isolated using the VNI. In a way, VXLAN "stretches" an L2 network on an L3 network. For purposes of illustration, FIG. 1 is described with respect to the VXLAN tunneling protocol, but may be implemented with a Network Virtualization using Generic Routing Encapsulation (NVGRE) protocol to provide an overlay tunneling protocol to encapsulate traffic and tunnel the traffic over a physical IP infrastructure between Network Virtualization Endpoints (NVEs). NVGRE uses Virtual Subnet Identifiers (VSIDs) to identify virtual L2 networks. Either VXLAN or NVGRE tunneling protocols may be used to provide tunneling of L2 BUM traffic over core network 12 to provide network virtualization overlay between PEs 10.

In the example of FIG. 1, customer networks 6 are interconnected by a core network 12. For example, core network 12 may implement EVPN over VXLAN tunneling techniques to provide an EVPN-VXLAN network overlay (or EVPN-NVGRE network overlay in instances in which NVGRE is used as a tunneling protocol. Core network 12 may alternatively be referred to as "VXLAN core 12" (or "NVGRE core 12"). PEs are VTEPs for the VXLAN core that forward MAC frames encapsulated with a VXLAN header over VXLAN core 12 to other PEs 10. In this way, PEs 10 provide an EVPN-VXLAN network overlay using a VLXAN underlay to transport L2 communications, such as Ethernet packets or "frames," for customer networks 6, in a transparent manner, i.e., as if the core network 12 does not exist and customer networks 6 were instead directly connected. Further example structural and functional details of the EVPN-VXLAN network overlay are described in "A Network Virtualization Overlay Solution using EVPN," draft-ietf-bess-evpn-overlay-04, Internet Engineering Task Force (IETF), Jun. 10, 2016, the entire contents of which are incorporated herein by reference.

As shown in FIG. 1, CE 8A is multi-homed to core network 12 through PEs 10A, 10B by Ethernet segment (ES) 13. Multi-homed networks provide for redundancy, load balancing or both. Customer-facing ports of PEs 10A, 10B are configured as a logically bundled Ethernet segment 13 such that PEs 10A, 10B operate to provide, for example, active-active multi-homed L2 connectivity to CE 8A of customer network 6A. PEs 10A and 10B participate in a designated forwarder (DF) election for multi-homed Ethernet segment 13 to assign one of the PEs 10 to forward BUM traffic received from core network 12 to CE 8A. This may be done, for example, by PEs 10A, 10B by outputting an EVPN route advertising an Ethernet Segment Identifier (ESI).

In the example of FIG. 1, PE 10A may be elected the designated forwarder for Ethernet segment 13 with respect to BUM traffic received from core network 12 (e.g., EVPN- VXLAN network overlay) and forward the BUM traffic to customer network 6A. That is, as designated forwarder, PE 10A forwards the traffic into Ethernet segment 13 while PE 10B drops the traffic. Similarly, in an active-active configuration, PEs 10A, 10B may each forward traffic received from customer network 6A over the core network 12 via EVPN-VXLAN network overlay.

In an EVPN-VXLAN network, PEs 10A, 10B are each configured with a unique VXLAN ID/Source-VTEP IP for an EVPN-VXLAN network overlay. That is, each of PEs 10A, 10B presents a different IP address to the core network 12 and implements a different VTEP for the VXLAN core to provide independent forwarding between customer network 6A and core network 12. Because the EVPN-VXLAN network overlay utilizes an MC-LAG 24 for Ethernet segment 13 to reach customer network 6A, and MC-LAG typically requires the peer PE nodes for an MC-LAG to present a common IP address to the core network 12 in order to be considered a single entity by the core network 12, the independent VTEPs for PEs 10A, 10B may cause the peer MC-LAG nodes 10A, 10B to send/receive duplicate L2 BUM traffic coming from the VXLAN core or attached customer network in some scenarios.

For example, PE 10A may receive L2 BUM traffic (e.g., 11A) from CE 8A. PE 10A may forward a copy of the BUM traffic (e.g., 11B) to PE 6C over core network 12 per EVPN over VXLAN rules. PE 10A may additionally forward a copy of the BUM traffic (e.g., 11D) to the MC-LAG peer node, PE 10B over ICL 16 per MC-LAG rules. Despite already forwarding the BUM traffic on ICL 16, PE 10A may also forward a copy of the BUM traffic (e.g., 11E) to the peer VTEP, PE 10B, because PE 10A is unaware of the configuration of PE 10B as a peer VTEP for the MC-LAG bridge domain. Since the traffic was previously sent to PE 10B over ICL 16, PE 10B would receive duplicate traffic from the peer VTEP (PE 10A) per EVPN over VXLAN rules. PE 10B, in an active-active configuration, forwards another duplicate copy of the BUM traffic (e.g., 11F) to PE 10C over core network 12 per EVPN over VXLAN rules.

In accordance with the techniques described herein, PEs 10 may filter duplicate L2 BUM packets on VTEP interface for the EVPN-VXLAN overlay network to ensure that only one copy of the L2 BUM packet is received by each PE 10. For example, and as further described below, PE 10B may be configured to block L2 BUM traffic from peer VTEP 10A for the EPVN-VXLAN overlay network because PE 10B may receive a copy of such L2 BUM traffic from PE 10A via ICL 16. Moreover, the data plane forwarding unit of PE 10B may be configured such that an L2 BUM packet received over ICL 16 is processed as if received over the core network 12 (e.g., the VXLAN core) such that split-horizon forwarding rules prevent PE 10B from forwarding the L2 BUM packet from being forwarded back into the core network 12. As a result, PE 10B may avoid duplicate flooding of the L2 BUM packet to the VXLAN core, as PE 10A will flood the L2 BUM packet to the VXLAN core.

In some instances, PEs 10 may exchange extended ICCP messages that indicate the PEs 10 are peer VTEPs for an EVPN-VXLAN overlay network. That is, in addition to exchanging IP information of peer MC-LAG nodes (e.g., PEs 10A, 10B), the ICCP message may be extended to indicate any configured source VTEP associated with the MC-LAG peer nodes. For example, PEs 10A, 10B may be configured as a VTEP with PE 10B as a peer VTEP. PE 10A may send an extended ICCP message to PE 10B that indicates that PE 10A, which is an MC-LAG peer of PE 10B for MC-LAG 24, is a VTEP for an EVPN-VXLAN overlay network that provide L2 connectivity for Ethernet segment 13 that includes MC-LAG 24. The extended ICCP message may include a VXLAN ID (VNI) and a source IP address for PE 10A such that, based on the extended ICCP message, PE 10B may identify PE 10A as a source VTEP in addition to identifying PE 10A as a peer MC-LAG node to PE 10B. Based on the information in the extended ICCP message, PE 10B may install the source VTEP as a remote VTEP with a corresponding interface to the remote VTEP installed in a blocked state.

In operation, an L2 BUM packet originating from the multi-homed CE 8A (e.g., 11A) is forwarded to PE 10A. PE 10A, as a DF router, forwards a copy of the L2 BUM packet (e.g., 11B) into the core network 12 per EVPN over VXLAN rules towards PE 10C. PE 10C then forwards the copy of the L2 BUM packet (e.g., 11C) towards the single-homed CE 8C.

PE 10A and PE 10B are configured as peer MC-LAG nodes such that PE 10A forwards a copy of the L2 BUM packet (e.g., 11D) on ICL 16 towards PE 10B. PE 10A and PE 10B may exchange an extended ICCP message including a VXLAN ID that identifies PE 10A as a source VTEP of the MC-LAG bridge domain. In response to receiving the ICCP message, PE 10B may assign PE 10A as a remote VTEP with a corresponding interface to PE 10A installed in a blocked state on the packet forwarding engine, thereby blocking any duplicate copies of an L2 BUM packet (e.g., 11E) forwarded from PE 10A over core network 12.

Because a copy of the L2 BUM packet was previously forwarded over the core to PE 10C by PE 10A, PE 10B may be configured to filter duplicate L2 BUM packet from being forwarded back into the core network 12 toward PE 10C. For example, PE 10B may assign the interface associated with ICL 16 as a core-facing interface of PE 10B. PE 10B may apply split-horizon forwarding, based on the assigned core-facing interface, to process the L2 BUM traffic without forwarding the L2 BUM traffic over core network 12 (e.g., 11F). In this way, PE 10B may stop L2 BUM traffic received from ICL 16 from being forwarded back into the core network 12.

PE 10B, as the non-DF router, does not forward a copy of the L2 BUM packet (e.g., 11G) to CE 8A. PE 10B may forward a copy of the L2 BUM packet (e.g., 11H) towards single-homed CE 8B. In this way, the PE devices may receive or forward at most one packet of EVPN BUM traffic, received from a local customer network, to another PE device.

Figure 2:
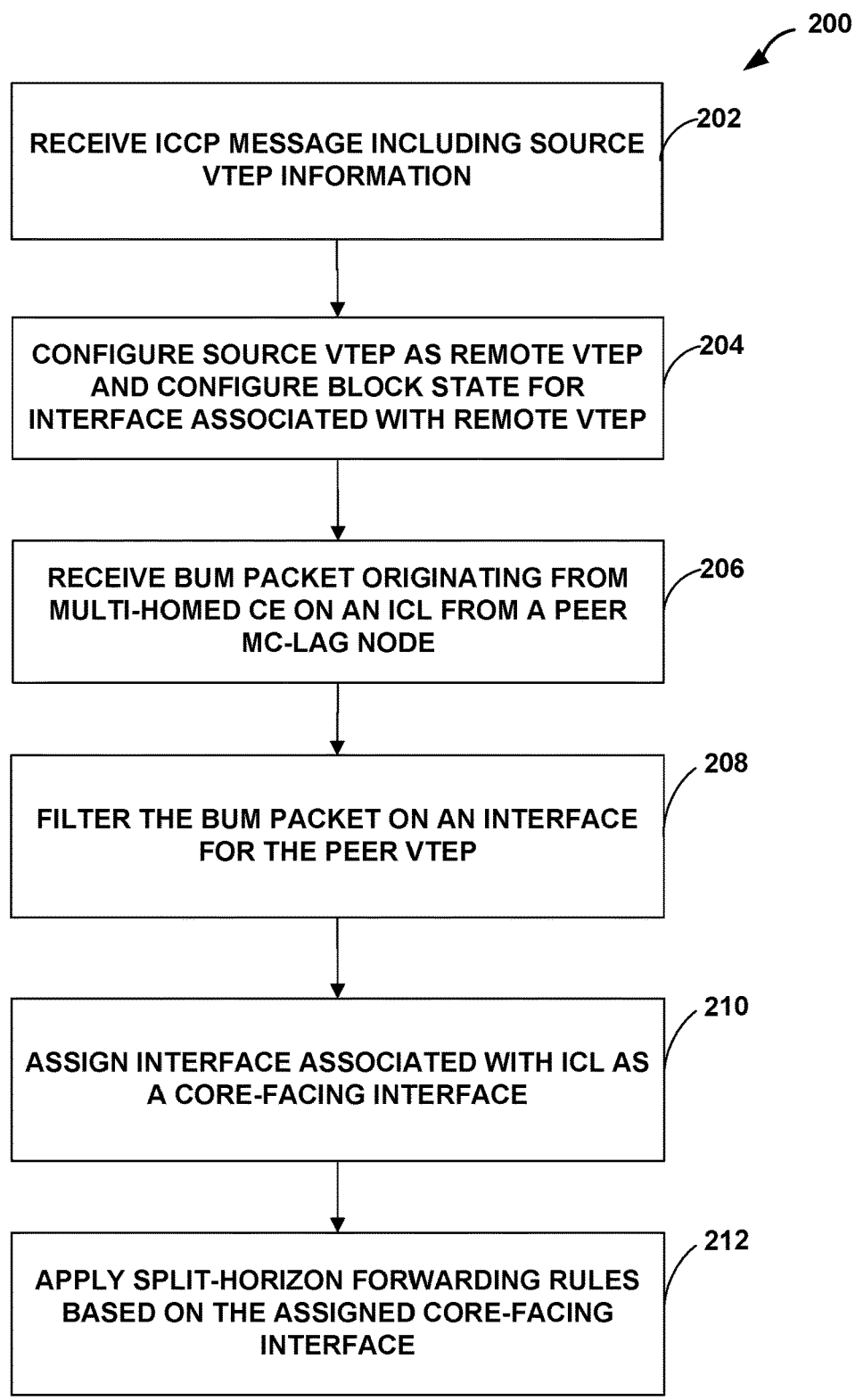
FIG. 2 is a flowchart illustrating an example operation of a provider edge network device for filtering duplicate broadcast, unknown unicast, and multicast (BUM) packets, according to the techniques described herein.

FIG. 2 is a flowchart illustrating an example operation of a provider edge network device for filtering duplicate L2 BUM packets, according to techniques described herein. Operation 200 is described with respect to PE 10B of FIG. 1, but may be performed by any PE device described herein.

In the example of FIG. 2, PE 10B may receive an extended ICCP message including configuration information of PE 10A (202). For example, in addition to communicating the configuration and/or running state data of the MC-LAG bridge domain, the extended ICCP message is further configured to provide information on peer VTEP nodes of the MC-LAG bridge domain. That is, by exchanging extended ICCP messages including source VTEP information, peer MC-LAG nodes are aware of peer VTEP nodes. For example, PE 10A may initially be configured as a source VTEP in an EVPN-VXLAN network and as a peer MC-LAG node to PE 10B. The extended ICCP message may include information of PE 10A as a peer MC-LAG node to PE 10B and configuration information of PE 10A as a source VTEP to PE 10B.

Upon receiving the extended ICCP message including the information on the peer VTEP node, the peer MC-LAG node, e.g., PE 10B, may configure the source VTEP (e.g., PE 10A) as a remote VTEP and configure a block state for an interface associated with the configured remote VTEP (204). For example, PE 10B may configure a blocked state on the interface of the packet forwarding engine that is associated with the configured remote VTEP, PE 10A. In this way, PE 10B may stop L2 BUM packets from being received from a VTEP peer that is also an MC-LAG peer.

PE 10B may receive from ICL 16 the L2 BUM packet that originated from multi-homed CE 8A (206). Based on the configuration above, PE 10B may filter a copy of the L2 BUM packet received over the core network 12 on the interface for the peer VTEP, e.g., PE 10A (208).

PE 10B may also assign the interface associated with ICL 16 as a core-facing interface (210). PE 10B may apply split-horizon forwarding rules, based on the assigned core-facing interface, to process the L2 BUM packet received over the ICL 16 without forwarding the L2 BUM packet towards core network 12 (212). That is, the packet forwarding engine of PE 10B may be configured to interpret the received BUM traffic as initially received over the core network 12. In this way, PE 10B may stop traffic received from ICL 16 from being forwarded back to the core network 12.

Figure 3:
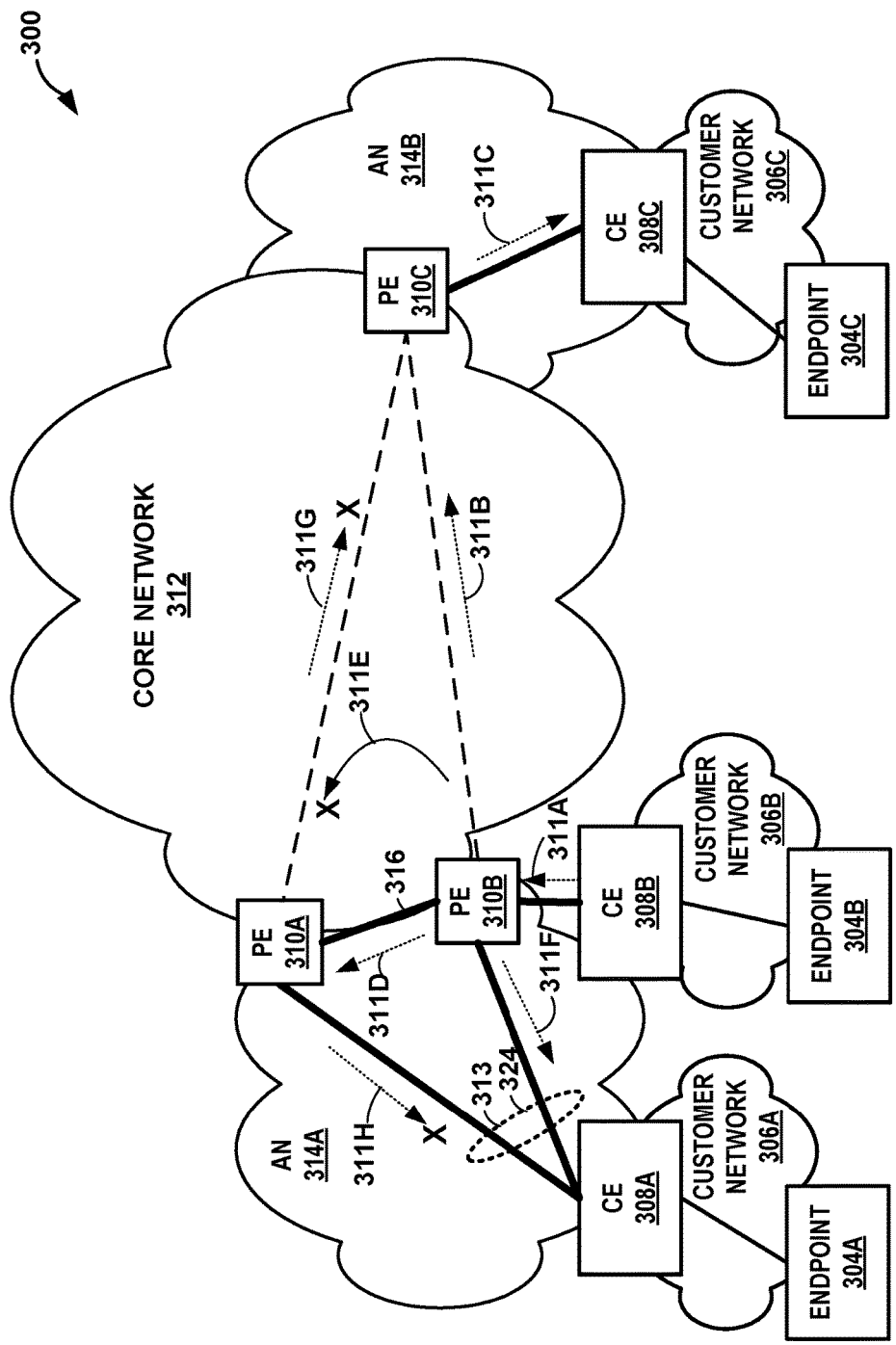
FIG. 3 is a block diagram illustrating another example network system in which provider edge (PE) network devices provide techniques for filtering duplicate broadcast, unknown unicast, and multicast (BUM) packets in a network in which EVPN traffic is tunneled, using a tunneling protocol such as VXLAN or NVGRE, over an IP core network to provide network virtualization overlay (NVO) between provider edge (PE) devices that operate as Network Virtualization Endpoints (NVEs) for the NVO/Virtual Tunnel Endpoints (VTEPs) for the tunneling protocol, according to the techniques described herein.

FIG. 3 is a block diagram illustrating another example network system in which provider edge (PE) network devices provide techniques for filtering duplicate broadcast, unknown unicast, and multicast (BUM) packets in a network in which EVPN traffic is tunneled, using a tunneling protocol such as VXLAN or NVGRE, over an IP core network to provide network virtualization overlay (NVO) between PE devices that operate as Network Virtualization Endpoints (NVEs) for the NVO/Virtual Tunnel Endpoints (VTEPs) for the tunneling protocol, according to the techniques described herein. Network 300 is configured similarly to network 2, except as described below. In the example of FIG. 3, rather than receiving an L2 BUM packet from a multi-homed CE device, PE 310B may receive an L2 BUM packet from single-homed CE 308B and forward at most one of the L2 BUM packet to other PE devices, e.g., PE 310A-310C while eschewing sending a copy of the L2 BUM packet to the PE 310A via the core network 312 (e.g., EVPN-VXLAN network overlay).

PE 310A may receive an extended inter-chassis control protocol (ICCP) message from PE 310B that includes MC-LAG configuration information and VTEP configuration information identifying the PE 310B as a source VTEP of PE 310B. As described above, the ICCP message may include the VXLAN ID for PE 310B. In response to receiving the VXLAN ID for PE 310B, PE 310A assigns PE 310B as a remote VTEP with the corresponding interface to PE 310B installed in a blocked state on the packet forwarding engine, thereby blocking any duplicate copies of the L2 BUM packet (e.g., 311E) forwarded from PE 310B over core network 312 towards PE 310A.

For example, PE 310B may receive an L2 BUM packet from single-homed host CE 308B (e.g., 311A). PE 310B, as the DF router, may forward the L2 BUM packet to CE 308A (e.g., 311F) and to PE 310C (e.g., 311B). As peer MC-LAG PE nodes, PE 310B may forward the L2 BUM packet to PE 310A over ICL 316. Based on the extended ICCP message, PE 310A is aware of the configuration of PE 310B as a peer VTEP and may configure a block on the interface for the peer VTEP. That is, PE 310A may block the L2 BUM packet forwarded over core network 312 from PE 310B. In this way, PE 310A may filter an L2 BUM packet on an interface for the VTEP to ensure that only one copy of the L2 BUM packet is received by PE 310A.

As a non-DF router, PE 310A does not forward the L2 BUM packet towards CE 308A (e.g., 311H). PE 310B is further stopped from forwarding the L2 BUM packet back into core network 312 towards PE 310C. For example, the forwarding engine of PE 310A is altered such that the traffic received from ICL 316 is processed as received from the core network 312 (e.g., EVPN-VXLAN network overlay). In one instance, PE 310A may assign the interface associated with ICL 316 as a core-facing interface of PE 310A. PE 310A may apply split-horizon forwarding, based on the assigned core-facing interface, to process the L2 BUM traffic received from ICL 316 without forwarding the L2 BUM traffic over core network 12 (e.g., 311G). In this way, PE 310A may stop duplicate L2 BUM traffic from being forwarded back into the core network 312.

Figure 4:
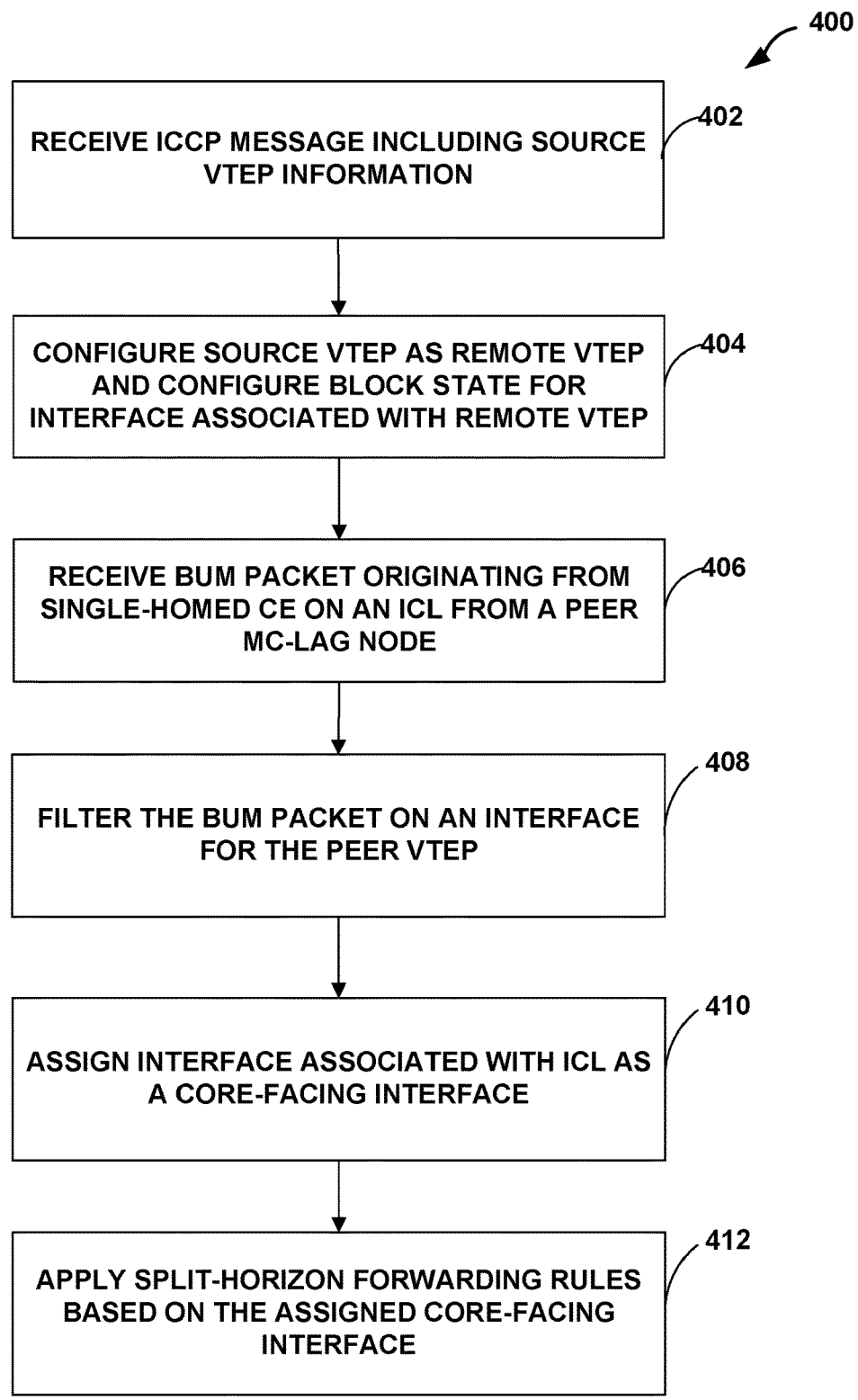
FIG. 4 is a flowchart illustrating another example operation of a provider edge network device for filtering broadcast, unknown unicast, and multicast (BUM) packets, according to the techniques described herein.

FIG. 4 is a flowchart illustrating an example operation of a provider edge network device for filtering duplicate L2 BUM packets, according to techniques described herein. Operation 400 is described with respect to PE 310A of FIG. 3, but may be performed by any PE device described herein.

In the example of FIG. 4, PE 310A may receive an extended ICCP message including configuration information of PE 310B (402). For example, in addition to communicating the configuration and/or running state data of the MC-LAG bridge domain, the extended ICCP message is further configured to provide information on peer VTEP nodes of the MC-LAG bridge domain. That is, by exchanging extended ICCP messages including source VTEP information, peer MC-LAG nodes are aware of peer VTEP nodes. For example, PE 310B may initially be configured as a source VTEP in an EVPN-VXLAN network and as a peer MC-LAG node to PE 310A. The extended ICCP message may include information of PE 310B as a peer MC-LAG node to PE 310A and configuration information of PE 310B as a source VTEP to PE 310A.

Upon receiving the extended ICCP message including the information on the peer VTEP node, the peer MC-LAG node, e.g., PE 310A, may configure the source VTEP (e.g., PE 310B) as a remote VTEP and configure a block state for an interface associated with the configured remote VTEP (404). For example, PE 310A may configure a blocked state on the interface of the packet forwarding engine that is associated with the configured remote VTEP, PE 310B. In this way, PE 310A may stop L2 BUM packets from being received from a peer VTEP that is also a peer MC-LAG node.

PE 310B may receive the L2 BUM packet from single-homed CE 308B and forward the L2 BUM packet towards PE 310A. PE 310A may receive the L2 BUM packet from ICL 316 connecting peer MC-LAG nodes, PE 310A and PE 310B (406). Based on the configuration above, PE 310A may filter any subsequent copy of the L2 BUM packet received over the core network 312 on the interface for the peer VTEP, e.g., PE 310B (408).

PE 310A may also assign the interface associated with ICL 316 as a core-facing interface (410). In this way, PE 310A may apply split-horizon forwarding rules, based on the assigned core-facing interface, to process the L2 BUM packet received over the ICL 316 without forwarding the L2 BUM packet towards core network 312 (412). That is, the packet forwarding engine of PE 310A may be configured to interpret the received BUM traffic as initially received over the core network 312. In this way, PE 310A may stop traffic received from ICL 316 from being forwarded to the core network 312.

Figure 5:
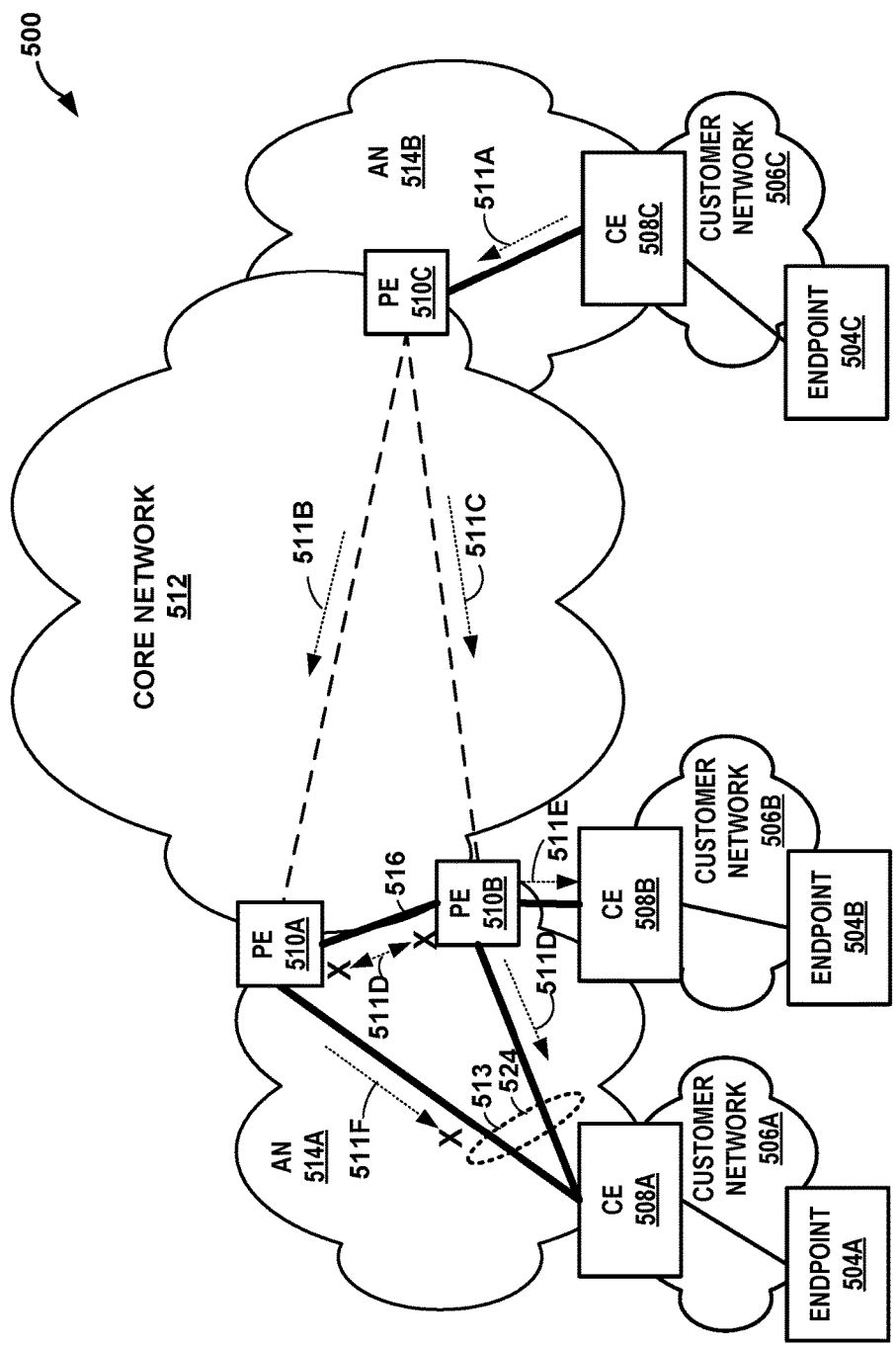
FIG. 5 is a block diagram illustrating another example network system in which provider edge (PE) network devices provide techniques for filtering duplicate broadcast, unknown unicast, and multicast (BUM) packets in a network in which EVPN traffic is tunneled, using a tunneling protocol such as VXLAN or NVGRE, over an IP core network to provide network virtualization overlay (NVO) between provider edge (PE) devices that operate as Network Virtualization Endpoints (NVEs) for the NVO/Virtual Tunnel Endpoints (VTEPs) for the tunneling protocol, according to the techniques described herein.

FIG. 5 is a block diagram illustrating another example network system in which provider edge (PE) network devices provide techniques for filtering duplicate broadcast, unknown unicast, and multicast (BUM) packets in a network in which EVPN traffic is tunneled, using a tunneling protocol such as VXLAN or NVGRE, over an IP core network to provide network virtualization overlay (NVO) between PE devices that operate as Network Virtualization Endpoints (NVEs) for the NVO/Virtual Tunnel Endpoints (VTEPs) for the tunneling protocol, according to the techniques described herein. Network 500 is similar to network 2, except as described below. As further described below, for an L2 BUM packet received over core network 512 by PEs 510A, 510B that are mapped to the same Ethernet segment 513, the forwarding engines of PEs 510A, 510B are configured such that duplicate L2 BUM packets are not forwarded along ICL 516 to peer MC-LAG nodes.

For example, PE 510A and PE 510B may be configured as peer VTEPs and as peer MC-LAG PE nodes. PE 510A and PE 510B may configure a check installed on the egress interface to the ICL link such that no L2 BUM packet received over core network 512 is forwarded to peer MC-LAG nodes.

In the example of FIG. 5, an L2 BUM packet originating from a remote host CE 508C (e.g., 511A) is flooded to PEs 510A, 510B (e.g., 511B, 511C) over core network 512. PE 510B, as the DF router, forwards a copy of the L2 BUM packet (e.g., 511D) towards the multi-homed CE 508A and single-homed CE 508B. PE 510A, as the non-DF router, drops the L2 BUM packet (e.g., 511F).

PEs 510A, 510B, having configured checks on an egress interface for ICL 516, block BUM traffic received over core network 512 from forwarding to peer MC-LAG nodes (e.g., 511D). For example, PEs 510A, 510B may configure a check to determine whether a link is an ICL. If the link is an ICL, the check will determine whether the ICL is mapped to the EVPN-VXLAN forwarding domain. In this way, PE 510A and PE 510B may receive one copy of the L2 BUM traffic over the core network 512 without sending a duplicate copy of the L2 BUM packet to each other via the ICL.

Figure 6:
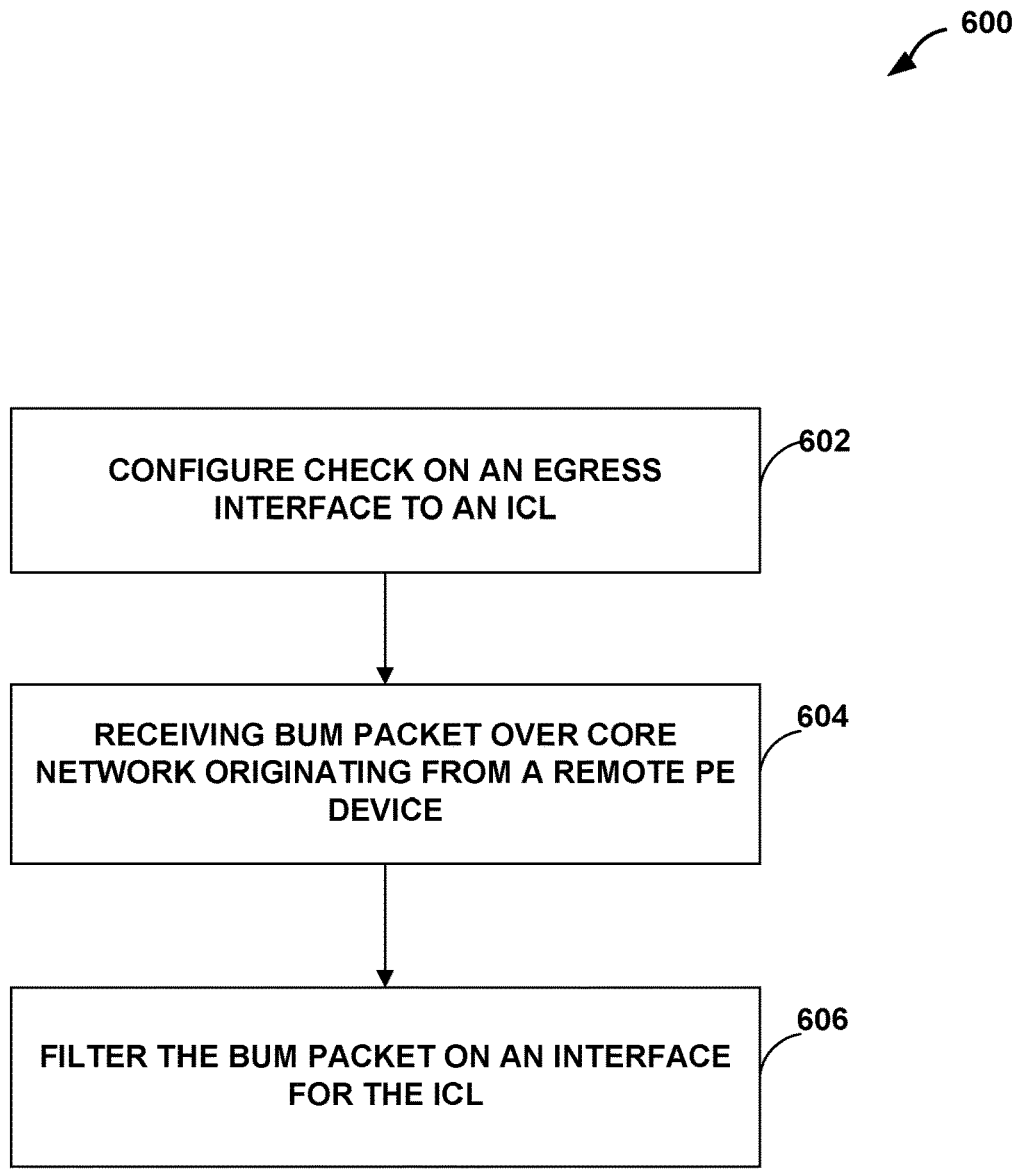
FIG. 6 is a flowchart illustrating another example operation of a provider edge network device for filtering broadcast, unknown unicast, and multicast (BUM) packets, according to the techniques described herein.

FIG. 6 is a flowchart illustrating an example operation of a provider edge network device for filtering duplicate L2 BUM packets, according to techniques described herein. Operation 600 is described with respect to PE 510A of FIG. 5, but may be performed by any PE network device described herein.

In the example of FIG. 6, the peer MC-LAG node, e.g., PE 510A, may configure a check on an egress interface of ICL 516 such that PE 510A may block BUM traffic received over core network 512 from being forwarded to the peer MC-LAG node PE 510B (602). For example, a check may be configured to determine if the link is an ICL and whether the ICL is mapped to an EVPN-VXLAN forwarding domain.

PE 510A may receive an L2 BUM packet over core network 512 from a remote PE device (604). For example, PE 510C may flood an L2 BUM packet on core network 512 for which PE 510A (and PE 510B) may receive the L2 BUM packet.

Based on the above configuration, PE 510A may filter the L2 BUM packet received from the core network 512 from being forwarded to peer MC-LAG nodes on the interface for ICL 516 (606).

Figure 7:
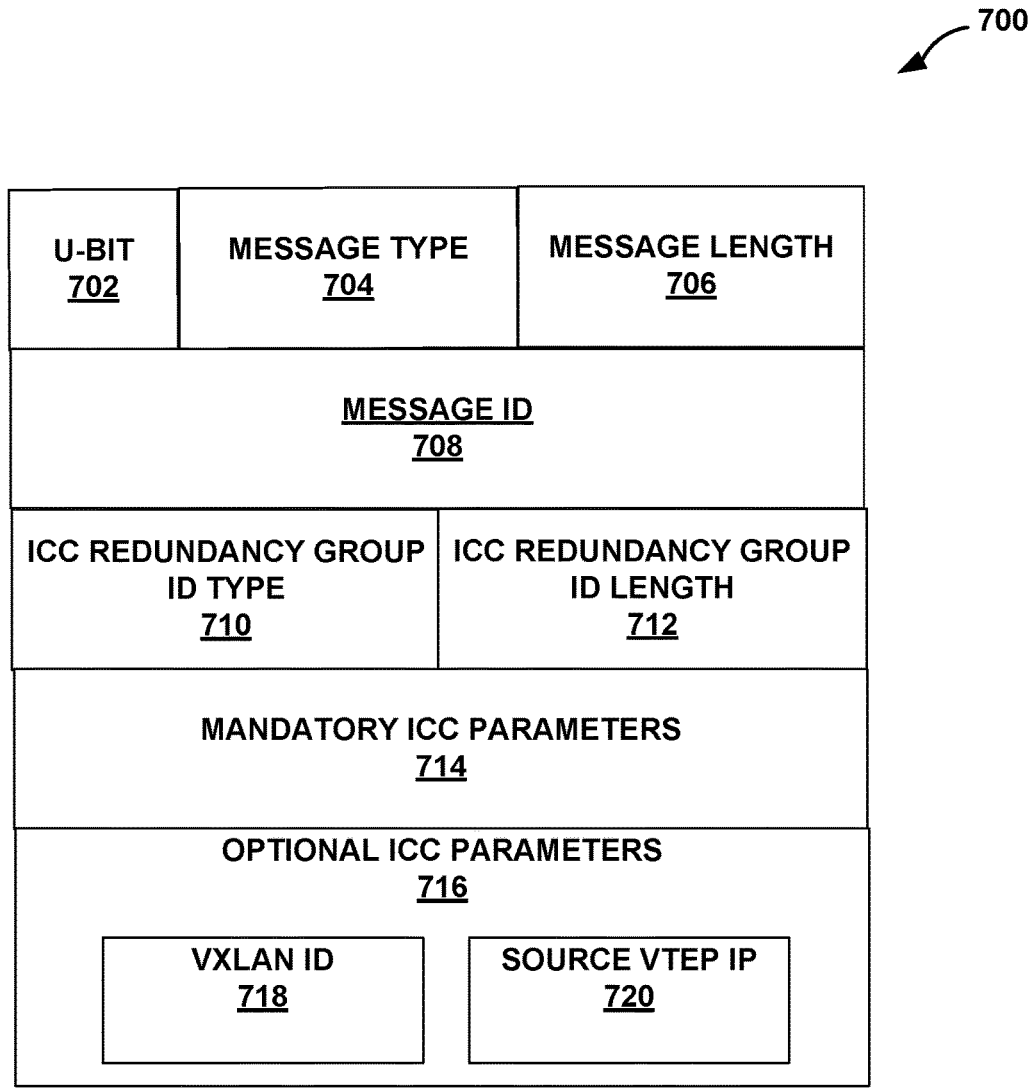
FIG. 7 is a block diagram illustrating an example extended inter-chassis control protocol (ICCP) message, according to the techniques described herein.

FIG. 7 is a block diagram illustrating an example ICCP message 700 in accordance with the techniques of this disclosure. The ICCP message includes an Inter-Chassis Communication (ICC) specific label distribution protocol (LDP) header ("ICC header") and message data. In one example, the ICC header includes a U-Bit 702 representing an unknown message bit for determining whether the message is unknown and ignored.

The ICC header also includes a Message Type 704, Message Length 706, and Message ID 706. The Message Type 704 representing the type of ICCP message. For example, the Message Type 704 may include a type "RG Connect Message" that represents a message used to establish the ICCP redundancy group connection in addition to individual application connections between PE devices in a redundancy group. The Message Length may include a 2-octet value specifying the total length of the ICCP message. The Message ID may include a 4-octet value that is used by the sending PE device to facilitate identifying "Redundancy Group Notification" messages that may apply to this message. In another example, the Message Type 704 may include a Redundancy Group Data Message used to carry data between PE devices within a redundancy group.

The ICC header may also include an ICC redundancy group ID type-length-value (TLV) having an ICC Redundancy Group ID Type 710 and an ICC Redundancy Group ID Length 712 that designates the redundancy group of which the sending device is a member.

The ICC header may further include mandatory ICC parameters 714 and optional ICC parameters 716. The mandatory ICC parameters 714 include any required parameters for ICCP messages. The optional ICC parameters 716 include any optional parameters for ICCP messages. In the example of FIG. 7, the ICCP message is extended to include optional ICC parameters 716 such as source VTEP information. The source VTEP information may include, for example, a virtual extensible LAN identifier (VXLAN ID) 718 and a source VTEP IP address 720 that identifies the source VTEP. In this way, the extended ICCP message is used to inform peer MC-LAG nodes of peer VTEP nodes. Based on the VXLAN ID 718 and source VTEP IP address 720 from the extended ICCP message, a PE device may install the source VTEP as a remote VTEP and configure a block on an interface for the VTEP of the same MC-LAG bridge domain. Further example details of ICCP are described in L. Martini et. al., "Inter-Chassis Communication Protocol for Layer 2 Virtual Private Network (L2VPN) Provider Edge (PE) Redundancy," Internet Engineering Task Force, RFC 7275, June 2014, which is incorporated herein in its entirety.

Figure 8:
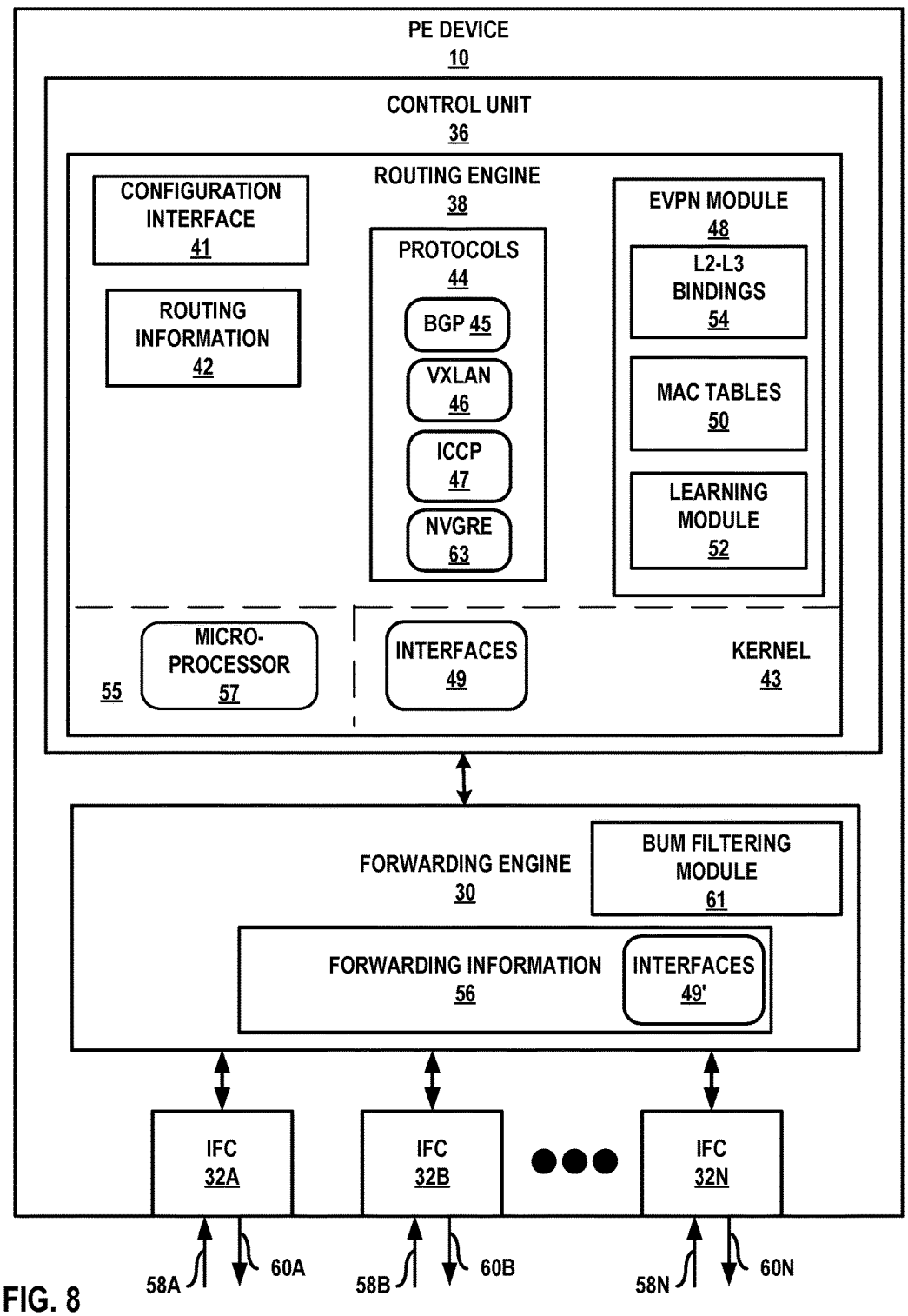
FIG. 8 is a block diagram illustrating an example provider edge network device for filtering broadcast, unknown unicast, and multicast (BUM) packets, according to the techniques described herein.

FIG. 8 is a block diagram illustrating further details of a PE device that applies techniques described herein. PE device 10 may represent an example of any of PEs 10, 310, and 510 of FIG. 1, 3, or 5 and may apply any one or more techniques described respect to PEs 10, 310, and 510. PE device 10 is described with respect to PE 10B of FIG. 1, but may be performed by any PE network device. PE device 10 includes a control unit 36 having a routing engine 38, and control unit 36 is coupled to forwarding engines 30A-30N ("forwarding engines 30" or "forwarding units"). Forwarding engines 30A-30N are associated with one or more interface cards 32A-32N ("IFCs 32") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof. For example, any of links 58, 60 may represent an interface for ICL 16 in the MC-LAG topology, a core-facing interface toward the EVPN-VXLAN core network of FIG. 1, or an access-facing interface toward a customer network.

Elements of control unit 36 and forwarding engines 30 may be implemented solely in software, or hardware, or may be implemented as combinations of software, hardware, or firmware. For example, control unit 36 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 36 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE device 10, e.g., protocols, processes, and modules. Control unit 36, in some examples, retrieves and executes the instructions from memory for these aspects.

Routing engine 38 includes kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 55 of routing engine 38 includes microprocessor 57 that executes program instructions loaded into a main memory (not shown in FIG. 8) from a storage device (also not shown in FIG. 8) in order to execute the software stack, including both kernel 43 and processes executing on the operating environment provided by kernel 43. Microprocessor 57 may represent one or more general or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 43 provides an operating environment that executes various protocols 44 at different layers of a network stack, including protocols for implementing an EVPN network. For example, routing engine 38 includes network protocols that operate at a network layer of the network stack. In the example of FIG. 8, example network protocols include the Border Gateway Protocol (BGP) 45, Virtual Extensible LAN (VXLAN) 46, NVGRE 63, and Inter-Chassis Communication Protocol (ICCP) 47. Routing engine 38 may include other protocols not shown in FIG. 8, such as an MPLS label distribution protocol and/or other MPLS protocols. Routing engine 38 is responsible for the maintenance of routing information 42 to reflect the current topology of a network and other network entities to which PE device 10 is connected. In particular, routing protocols periodically update routing information 42 to reflect the current topology of the network and other entities based on routing protocol messages received by PE device 10.

Kernel 43 includes an interfaces table 49 that represents a data structure that includes a corresponding entry for each logical interface configured for PE device 10. For example, interfaces table 49 may include an entry for an interface for the ICL (e.g., an interface of ICL 16 of FIG. 1) and an interface for a peer VTEP (e.g., peer VTEPs PE 10A, 10B of FIG. 1). Entries for respective interfaces may specify respective current information describing the interfaces.

Forwarding engines 30 represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE device 10 receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop.

In the example of FIG. 8, forwarding engine 30 includes forwarding information 56. In accordance with routing information 42, forwarding engine 30 stores forwarding information 56 that maps packet field values to network destinations with specific next hops and corresponding outbound interface ports. For example, routing engine 38 analyzes routing information 42 and generates forwarding information 56 in accordance with routing information 42. Forwarding information 56 may include interfaces table 49', which includes representations of configured interfaces from interfaces table 49. Routing engine 38 provides a representation of interfaces table 49 to the forwarding engine 30 such that forwarding engine 30 may filter duplicate L2 BUM traffic based on information within interfaces table 49' in accordance with the techniques described herein. Forwarding information 56 may be maintained in the form of one or more tables, link lists, radix trees, databases, flat files, or any other data structures.

Forwarding engine 30 stores forwarding information 56 for each Ethernet VPN Instance (EVI) established by PE device 10 to associate network destinations with specific next hops and the corresponding interface ports. Forwarding engine 30 forwards the data packet on one of outbound links 60 to the corresponding next hop in accordance with forwarding information 56 associated with an Ethernet segment. At this time, forwarding engine 30 may push and/or pop labels from the packet to forward the packet along a correct LSP.

Routing engine 38 includes a configuration interface 41 that receives and may report configuration data for PE device 10. Configuration interface 41 may represent a command line interface; a graphical user interface; Simple Network Management Protocol (SNMP), Netconf, or another configuration protocol; or some combination of the above in some examples. Configuration interface 41 receives configuration data configuring the PE device 10, and other constructs that at least partially define the operations for PE device 10.

Routing engine 38 also includes an EVPN module 48 having a learning module 52 that performs layer two (L2)

learning. EVPN module 48 may maintain MAC tables 50 for each EVI configured for PE device 10, or in alternative examples may maintain one or more MAC tables 50 that are independent of each respective EVI. Learning module 52 may alternatively be configured for execution, in full or in part, by forwarding engine 30. EVPN module 48 may implement an EVPN-VXLAN or EVPN-NVGRE network overlay.

Learning module 52 may perform local L2/L3 (e.g., MAC/IP) binding learning by, e.g., using MAC information received by PE device 10. Learning module 52 may detect a new MAC address on an EVI access interface for an EVI and add the MAC address, with a mapping to the EVI access interface to one of the MAC tables 50 for the EVI. Learning module 52 may then advertise an EVPN MAC advertisement route using BGP 46 to remote PEs for the EVI. The MAC advertisement route may include a route target corresponding to the EVI, the MAC address, the Ethernet tag for the bridge domain in which the MAC address was learned, the ESI in which the MAC address was learned, the IP address corresponding to the MAC address (if known), and an EVPN label. With remote MAC learning, learning module 52 may receive an EVPN MAC advertisement route from another PE and install a host route for the IP address (if included) with protocol type EVPN to the appropriate VRF for the EVI and install the MAC address in the MAC table 50 of the EVI, as well as the MAC information associated with the host route in the VRF 22 including the EVPN label.

EVPN module 48 may maintain one or more L2 address-L3 address (L2-L3) bindings 54 received and learned from peer PE routers for the EVI via BGP 46. Each L2-L3 binding 54 can map an L3 address for a host connected to the peer PE device via an Ethernet segment to an L2 address for the host. For example, an L2-L3 binding 54 may map a MAC address configured for endpoint 4A of FIG. 1 connected to PE device 10A via an Ethernet segment to a MAC address configured for endpoint 4A.

PE device 10 may filter duplicate L2 BUM packets in a network in which EVPN traffic is tunneled, using a tunneling protocol such as VXLAN or NVGRE, over an IP core network, according to the techniques described herein. For example, routing engine 38 may install a source VTEP as a remote VTEP with the corresponding interface installed in a blocked state on forwarding engine 30 such that L2 BUM packets received from a peer VTEP is blocked.

As another example, forwarding engine 30 may include a BUM filtering module 61 that may assign an interface for the ICL as a core-facing interface such that forwarding engine 30 processes the L2 BUM packet as if received over the core network. Forwarding engine 30 may apply split-horizon forwarding rules, based on the assigned core-facing interface, to process the L2 BUM packet received over the ICL without forwarding the L2 BUM packet on the assigned core-facing interface. BUM filtering module 61 may further configure a check on the egress interface of PE device 10 to the ICL such that BUM traffic received over the core network is not forwarded to the peer MC-LAG node.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random dom access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various examples of the techniques have been described. These and other examples are within the scope of the following claims.

What is claimed is:

1. A method comprising:
   receiving, by a first provider edge (PE) device, configuration data that configures the first PE device to provide an Ethernet Virtual Private Network (EVPN) network overlay over a layer 3 core network using a tunneling protocol, wherein the first PE device and a second PE device are peer virtual tunnel endpoints (VTEPs) for the tunneling protocol, and
   wherein the configuration data further configures the first PE device to provide, with the second PE device, multi-chassis link aggregation group (MC-LAG) multi-homing to a customer device using two or more links that form an MC-LAG that is an Ethernet segment of the EVPN network overlay, wherein an Inter-Chassis Link (ICL) with the second PE device connects the first PE device and the second PE device for the MC-LAG; and
   filtering, by the first PE device, a layer 2 (L2) broadcast, unknown unicast, and multicast (BUM) packet an interface for a VTEP with the second PE device without filtering the L2 BUM packet on an interface for the ICL with the second PE device to ensure that a single copy of the L2 BUM packet is received by each of the first PE device and the second PE device.

2. The method of claim 1, wherein the tunneling protocol comprises at least one of Virtual Extensible Local Area Network (VXLAN) and Network Virtualization using Generic Routing Encapsulation (NVGRE).

3. The method of claim 1, wherein filtering the L2 BUM packet on the interface for the VTEP with the second PE device comprises:
configuring, by the first PE device, the interface for the VTEP with the second PE device to block L2 BUM packets from a bridge domain of the MC-LAG, wherein the L2 BUM packet is from the bridge domain of the MC-LAG.

4. The method of claim 1, wherein filtering the L2 BUM packet on the interface for the VTEP with the second PE device comprises:
receiving, by the first PE device and from the second PE device, an inter-chassis communication protocol (ICCP) message indicating the second PE device is a source VTEP for the tunneling protocol;
configuring, by the first PE device and in response to receiving the ICCP message, the source VTEP as a remote VTEP of the first PE device, wherein the interface for the VTEP with the second PE device comprises an interface for the remote VTEP; and
configuring, by the first PE device, the interface for the remote VTEP to block L2 BUM packets received over the core network from the second PE device.

5. The method of claim 1, wherein the L2 BUM packet comprises a first L2 BUM packet, the method further comprising:
configuring, by the first PE device, an egress interface for the ICL with the second PE device to block L2 BUM packets received from the core network from being forwarded to the second PE device via the ICL; and
filtering, by the first PE device, a second L2 BUM packet, received from the core network, on the egress interface for the ICL with the second PE device.

6. The method of claim 1, further comprising:
filtering, by the first PE device, the L2 BUM packet, received on an interface for the ICL with the second PE device, from being forwarded over the core network.

7. The method of claim 6, wherein filtering the L2 BUM packet, received on the interface for the ICL with the second PE device, from being forwarded over the core network comprises:
assigning the interface for the ICL with the second PE device as a core-facing interface of the first PE device; and
applying split-horizon forwarding, based on the assigned core-facing interface, to process the L2 BUM packet without forwarding the L2 BUM packet over the core network.

8. The method of claim 1, wherein the configuration data defines an EVPN instance (EVI) for the EVPN network overlay.

9. A network device comprising:
one or more processors operably coupled to a memory;
a routing engine configured for execution by the one or more processors to:
receive configuration data that configures the network device to provide an Ethernet Virtual Private Network (EVPN) network overlay over a layer 3 core network using a tunneling protocol, wherein the network device and a second network device are peer virtual tunnel endpoints (VTEPs) for the tunneling protocol, and
wherein the configuration data further configures the network device to provide, with the second network device, multi-chassis link aggregation group (MC-LAG) multi-homing to a customer device using two or more links that form an MC-LAG that is an Ethernet segment of the EVPN network overlay, wherein an Inter-Chassis Link (ICL) with the second network device connects the network device and the second network device for the MC-LAG; and
a forwarding engine configured for execution by the one or more processors to filter a layer 2 (L2) broadcast, unknown unicast, and multicast (BUM) packet on an interface for a VTEP with the second network device without filtering the L2 BUM packet on an interface for the ICL with the second network device to ensure that a single copy of the L2 BUM packet is received by the second network device.

10. The network device of claim 9, wherein the tunneling protocol comprises at least one of Virtual Extensible Local Area Network (VXLAN) and Network Virtualization using Generic Routing Encapsulation (NVGRE).

11. The network device of claim 9, wherein to filter the L2 BUM packet on the interface for the VTEP with the second network device, the interface for the VTEP with the second network device on forwarding engine is configured to block L2 BUM packets from a bridge domain of the MC-LAG, wherein the L2 BUM packet is from the bridge domain of the MC-LAG.

12. The network device of claim 9, wherein the routing engine is further configured to:
receive, from the second network device, an inter-chassis communication protocol (ICCP) message indicating the second network device is a source VTEP for the tunneling protocol;
configure, in response to receiving the ICCP message, the source VTEP as a remote VTEP of the network device, wherein the interface for the VTEP with the second network device comprises an interface for the remote VTEP; and
configuring the forwarding engine with the interface for the remote VTEP to block L2 BUM packets received over the core network from the second network device.

13. The network device of claim 11, wherein the L2 BUM packet comprises a first L2 BUM packet, and wherein the forwarding engine is further configured to:
filter a second L2 BUM packet, received from the core network, on the interface for the ICL with the second network device by configuring an egress interface for the ICL with the second network device to block L2 BUM packets received from the core network from being forwarded to the second PE device via the ICL to ensure that a single copy of the L2 BUM packet is received by the second network device.

14. The network device of claim 11, wherein the tunneling protocol comprises at least one of Virtual Extensible Local Area Network (VXLAN) and Network Virtualization using Generic Routing Encapsulation (NVGRE).

15. The network device of claim 11, wherein the forwarding engine is further configured with an ingress interface for the ICL that blocks L2 BUM packets received from the ICL from being forwarded over the core network.

16. The network device of claim 15,
wherein the ingress interface for the ICL is configured to appear as a core-facing interface,
wherein the forwarding engine is configured to apply split-horizon forwarding, based on the assigned core-facing interface, to process the L2 BUM packet without forwarding the L2 BUM packet over the core network.

17. A non-transitory computer-readable storage medium comprising instructions for causing at least one programmable processor of a network device to:

receive configuration data that configures the network device to provide an Ethernet Virtual Private Network (EVPN) network overlay over a layer 3 core network using a tunneling protocol, wherein the network device and a second network device are peer virtual tunnel endpoints (VTEPs) for the tunneling protocol, and wherein the configuration data further configures the network device to provide, with the second network device, multi-chassis link aggregation group (MC-LAG) multi-homing to a customer device using two or more links that form an MC-LAG that is an Ethernet segment of the EVPN network overlay, wherein an Inter-Chassis Link (ICL) with the second network device connects the network device and the second network device for the MC-LAG; and filter a layer 2 (L2) broadcast, unknown unicast, and multicast (BUM) packet on an interface for a VTEP with the second network device without filtering the L2 BUM packet on an interface for the ICL with the second network device to ensure that a single copy of the L2 BUM packet is received by each of the network device and the second network device.

* * * * *